April 12, 1938. A. B. MILLER Re. 20,694

METHOD OF MAKING COVERING MATERIAL

Original Filed Aug. 31, 1934 2 Sheets-Sheet 1

INVENTOR.
ABRAHAM BECK MILLER.
BY Charles S. Evans
HIS ATTORNEY

April 12, 1938. A. B. MILLER Re. 20,694

METHOD OF MAKING COVERING MATERIAL

Original Filed Aug. 31, 1934 2 Sheets-Sheet 2

INVENTOR.
ABRAHAM BECK MILLER.
BY Charles S. Evans
HIS ATTORNEY

Reissued Apr. 12, 1938 Re. 20,694

UNITED STATES PATENT OFFICE 20,694

METHOD OF MAKING COVERING MATERIAL

Abraham Beck Miller, Newark, Del., assignor to The Paraffine Companies, Inc., San Francisco, Calif., a corporation of Delaware Original No. 2,027,744, dated January 14, 1936, Serial No. 742,288, August 31, 1934. Application for reissue June 26, 1937, Serial No. 150,620

14 Claims. (Cl. 41—26)

My invention relates to covering materials, and more particularly to improvements in the decorative values of such materials.

It is among the objects of my invention to provide a decorative covering material having a grained surface of striking beauty.

Another object of my invention is to provide a covering material of the character described which is capable of being fabricated in the form of a comparatively thin sheet, adapted for such uses as wall-paper and other bonded surface coverings, and for purposes, such as wrapping paper, where a thin flexible sheet material of decorative value is desired.

Another object of my invention is to provide a method of forming an inlaid design in a very thin coating layer, say in the order of .007 inch thick, so that a covering material may be produced which, including its backing sheet, is of substantially paper thickness.

Another object of my invention is to provide such a coating layer which may be formed to embody any desired pattern, or inlaid design, such as for example the beautiful types of inlaid pattern grainings and marblings developed in the art of inlaid linoleum.

Another object of my invention is to provide a covering material of the character described which is tough and pliable, and which presents a washable surface.

Still another object of my invention is to provide an improved laminated covering structure embodying the decorative coating layer of my invention.

A further object of my invention is to provide a method of manufacturing the covering material by a continuous process.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings.

In terms of broad inclusion, the method of making the covering material embodying my invention comprises preparing a sheet, preferably of plastic material such as linoleum composition, so that it embodies the pattern character desired in the covering material. This sheet is then placed against the surface of a body, such as the side of another sheet, upon which the design is to be imparted, and a bond is formed between the two which exceeds the bonding force between the particles of the plastic sheet. The plastic sheet is then peeled from the body. During this peeling step the surface portions of the plastic sheet are split off and left on the surface of the body. The surface layer split off from the plastic sheet is very thin, yet there is sufficient material transferred to carry over the major elements of the design.

If the design initially formed in the plastic sheet is inlaid, the pattern persists through the sheet, and repeated layers may be taken from the sheet before it is discarded. When the decorative layer so transferred is imparted directly to another sheet, the latter may comprise a part, such as the backing sheet, of the final covering material; or, the sheet upon which the decoration is applied may be transparent, in which case it may form an outer layer overlying the decorative layer. In either case, a coating, either transparent or pigmented, is preferably applied over the decorative layer.

If desired, the decorative layer, after being applied on one sheet, may be transferred to another sheet, the latter comprising a part of the final covering material. Furthermore, the first transfer may be made to an intermediate body which is in the nature of a metallic drum rather than a sheet, and the decorative layer then transferred from the drum to the final sheet.

The decorative layer as it appears in the final covering material is of irregular thickness, by virtue of the method employed in its application, and in some places is so thin as to be translucent, or actually discontinuous. In other places the layer is heavier and opaque, and carries a sufficient amount of the pigmented plastic composition to include the inlaid striations of the original pattern. Preferably the layer underlying the decorative layer is given a background color, so that the ground color is visible through the transparent or translucent areas of the decorative layer.

Figure 1:
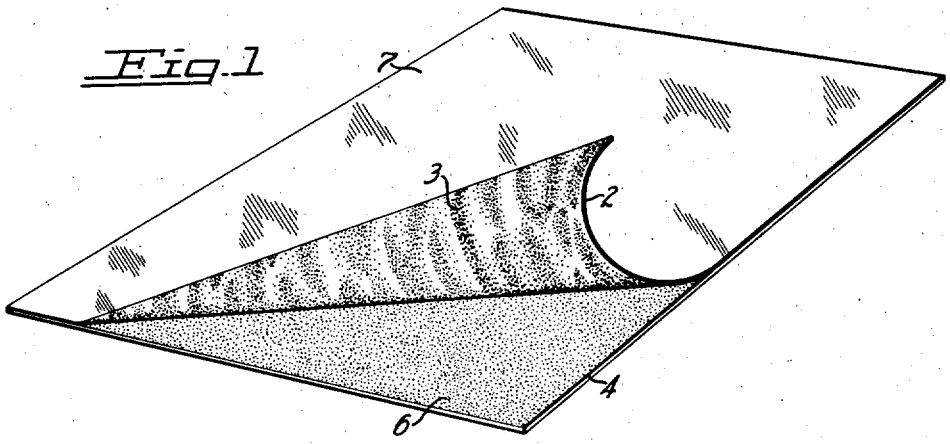
Fig. 1 is a perspective view showing a type of covering material embodying my invention, portions of the laminated sheet being folded back to illustrate the construction more clearly.
Figure 2:
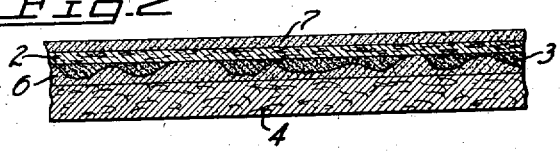
Fig. 2 is an enlarged vertical sectional view of the same.

In greater detail, and referring particularly to Figs. 1 and 2, a type of covering material embodying the improvements of my invention is shown as comprising an overlying transparent sheet 2 of a tough, flexible material, such as Cellophane. This well known material is a lustrous, non-fibrous transparent regenerated cellulose sheeting. It is understood, however, that other suitable materials may be employed in this layer, the chief requirement being that it be transparent, although considerable latitude is allowed even in this qualification. It is unnecessary that the sheet be clearly transparent. It might merely be translucent. By the term "transparent", therefore, I mean to include all degrees of transparency, from clear transparency to translucency. Coated on the under surface of the transparent sheet 2 is a decorative layer 3. This layer is pigmented and carries the design configuration, and is preferably of an initially plastic material, such as linoleum composition. The colored components making up the pattern, or grainings, in the decorative layer 3 are preferably inlaid in the layer, in the same sense that the colored components of linoleum composition are inlaid in what is known as the "inlaid" type of linoleum. The inlaid pattern grainings, such as the beautiful marblings developed in the art of inlaid linoleum, are preferably employed in the decorative coating 3 of my present covering material.

The decorative coating 3 in my material is comparatively thin, preferably averaging about .007 inch thick. It will also be noted that the layer 3 is of irregular thickness, and in some places is so thin as to be translucent, or actually discontinuous. In other places the layer is heavier and opaque. While I have mentioned linoleum composition as being a suitable material for use in the decorative layer 3, it is understood that other materials may be used. This will be appreciated more clearly as the method, by which the coating layer 3 is applied, is developed.

As best shown in Fig. 2, the transparent sheet 2, carrying the decorative coating 3, is bonded to a base 4 by means of an adhesive layer 6. The adhesive layer 6 may be transparent, or it may contain a pigment. If colored, the layer 6 is preferably of background coloration, so that the ground color will be visible through the transparent or translucent areas of the decorative layer 3. The background may be of a plain color or of a design configuration. Of course the adhesive layer 6 may be transparent, and the background coloration provided by the base 4. The base 4 may be in the form of a sheet, and may be of any suitable material, such as paper, cloth or fiberboard. On the other hand, the base 4 may be in the nature of a prefabricated object, such as a container, piece of furniture, or the like.

The type of adhesive employed in the layer 6 is subject to variation within wide limits. A cement of the thermoplastic type is preferably used. Ordinary rosin suitably plasticized, and either deposited from solution or applied hot to the base by means of a scraper or roller, is a suitable adhesive. Gum-like, natural or synthetic resins may be used without a plasticizer. Ordinary linoleum cement may be used, as may other oil-resin combinations. The vegetable and animal glues may also be used. If an asphalt adhesive is used its natural black color will provide a dark background, when such is desired. As also best shown in Fig. 2, the upper surface of the Cellophane sheet 2 is provided with a surface coating 7. This outer coating is of a transparent waterproof material, such as lacquer, so that the covering is rendered washable, a feature which is highly desirable. Of course the coating 7 may be omitted where the transparent layer 2 has been preprocessed so as to render it waterproof, as in the case of waterproof Cellophane.

Figure 6:
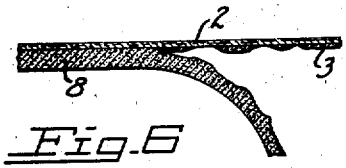
Fig. 6 is a vertical sectional view of the material during a stage of the process, showing the peeling operation.

The method of forming the thin decorative layer 3 on the Cellophane sheet 2 is illustrated in Fig. 6. The first step is to prepare a sheet 8 of plastic material, such as uncured linoleum composition. This sheet carries the design desired in the decorative layer 3, and is preferably a sheet of unmatured inlaid linoleum. Many beautiful types of inlaid pattern grainings and marblings have been developed in the art of inlaid linoleum, and are available for the purpose I employ the linoleum composition in my improved covering material. The plastic sheet 8 is placed against the sheet 2 and a bond formed between these bodies which exceeds the binding force between the particles of the plastic linoleum composition in the sheet 8.

I have formed such a bond by placing the sheets under pressure and subjecting them to a temperature of about 200° F. for about five seconds. After the bond has been formed the plastic sheet 8 is peeled from the sheet 2 being decorated. During this peeling operation the surface portions of the plastic sheet are split off and retained on the sheet 2 in a more or less continuous layer. This layer is very thin, being on an average of about .007 inch thick, but contains sufficient material to carry over the major elements of the design existing in the sheet 8. By reason of the fact that the design is inlaid in the sheet 8, and for that reason persists through the thickness of the sheet, repeated transfers can be made from the same sheet. After a given sheet begins to lose beauty, however, it is sent back to be reworked into a new sheet.

A pleasing texture may be imparted to the material if the sheet 2 is placed against a roughened surface when in the press. A convenient way of effecting this roughening is by interposing a sheet of fabric, such as 4 oz. Ozenburg cloth, between the press and the sheet 2. Of course any other means for providing a roughened surface may be employed. It is to be understood that other means, such as an independent adhesive, may be employed for effecting the bond between the plastic sheet 8 and the sheet 2 being decorated. The application of heat and pressure is preferred, however, because it utilizes the inherent adhesive properties of the material. It is also understood that plastic design carrying materials, other than linoleum composition, may be employed in the sheet 8. For example, plastic sheets of asphalt, rubber or synthetic resin compositions may be employed.

Figure 5:
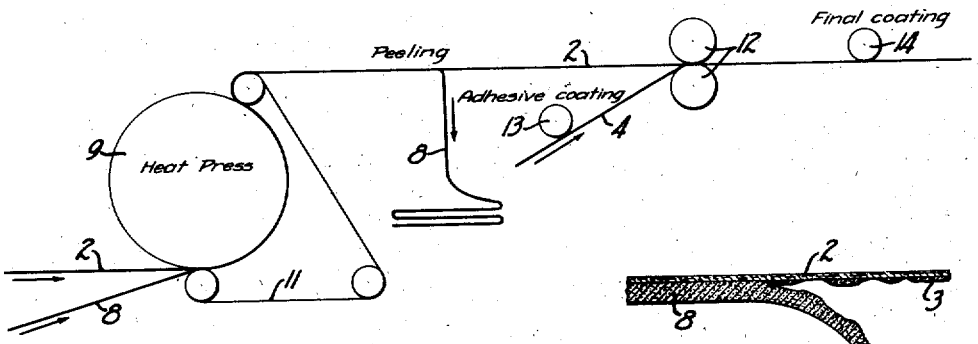
Fig. 5 is a diagrammatic view illustrating the method employed in fabricating the material shown in Figs. 1 and 2.

The method of making the laminated covering material shown in Figs. 1 and 2 is illustrated diagrammatically in Fig. 5. The Cellophane sheet 2 and plastic design carrying sheet 8 are fed together between a heated drum 9 and pressure belt 11. After emerging from this heat press the united sheets are fed forwardly, and promptly after leaving the press, and while the plastic sheet is still warm the latter is peeled from the Cellophane sheet. Subsequent to this peeling operation the Cellophane sheet, now carrying its decorative coating, is passed between a pair of pressure rolls 12 together with the base sheet 4 which had previously had an adhesive coating applied on its upper surface by a suitable device 13. After this laminating operation the composite sheet passes under a coating device 14 and receives the surface coating on its upper surface. By this method a continuous process of manufacturing the covering material is provided.

Figure 3:
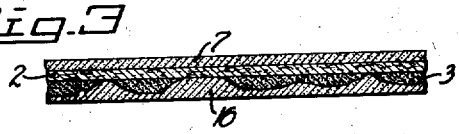
Figs. 3 and 4 are similar views showing modified forms of the covering material.

Instead of the composite covering structure shown in Fig. 2, a marketable covering comprising the first three layers 1, 2 and 3, or even the layers 2 and 3 alone, may be provided. In this case the purchaser may cement the material on any suitable base to build up the complete structure. The covering material may also be manufactured in the form shown in Fig. 3. In this case the backing for the sheet merely comprises a layer 16 of suitable material, such as paint. The pigment in this paint layer therefore provides the background color as did the pigment in the adhesive layer 6 of the structure shown in Fig. 2.

Figure 4:
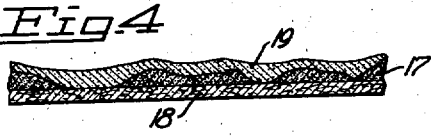

Still another form of material is shown in Fig. 4. In this case the decorative layer 17 is formed directly on a base sheet 18, such as paper. In the process of making this type of covering material the paper base sheet 17 is bonded with the plastic sheet, so that when the plastic sheet is peeled off the material split off is left on the base sheet. The color of the paper comprising the base sheet may be employed for the background color, or the sheet may be given a surface coloring before the decorative layer is applied. A surface coating 19 of suitable waterproof material, such as lacquer, is preferably provided to form a washable covering material. As illustrated in Fig. 4, the surface coating 19 tends to follow somewhat the surface contour of the irregular layer 17. This irregularity of surface tends to promote rather than detract from the beauty of the covering material. While the enlarged view shown in Fig. 4 gives the impression of material thickness, it is to be understood that the actual covering material does not exceed ordinary writing paper thickness. This type of covering provides an ideal wall-paper.

Figure 7:
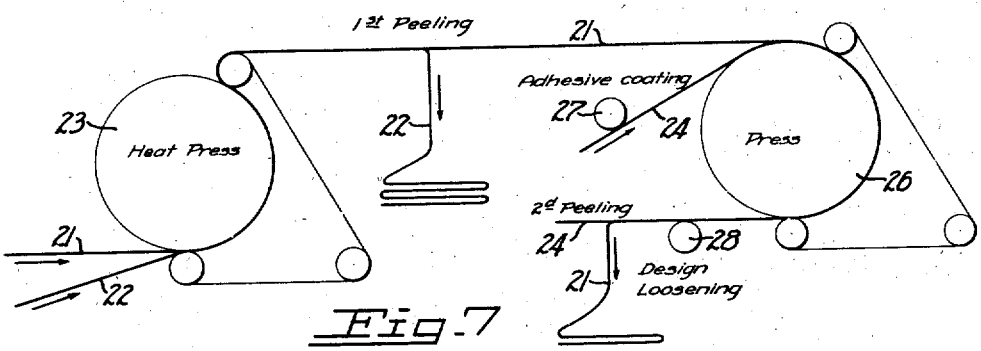
Fig. 7 is another diagrammatic view illustrating a variant form of process embodying the improvements of my invention.

Fig. 7 illustrates diagrammatically a variant form of method embodying the improvements of my invention. In this method a temporary transfer sheet 21 of any suitable material, such as Cellophane, is bonded to a plastic sheet 22, such as linoleum composition, by pressing the two together in a suitable heat press 23, following which the linoleum composition is peeled from the Cellophane sheet, leaving a portion of the composition on the latter sheet. These steps of the process are similar to those of the method described in connection with Fig. 5. After the first peeling operation the Cellophane sheet 21 carrying the decorative coating is pressed against another sheet 24 in a second press 26. The latter sheet comprises a part, such as the base sheet, of the final covering, and may be of any suitable material, such as paper.

Prior to entering the press 26, the sheet 24 is preferably given an adhesive coating by a suitable device 27. The purpose of this adhesive is to provide a stronger bond with the decorative coating on the Cellophane sheet than that existing between the decorative layer and the Cellophane. Any suitable adhesive may be used, such as an oleo-resinous composition, or a vegetable or animal glue. After the sheets have been pressed together in the press 26 the Cellophane sheet 21 is peeled from the base sheet 24, leaving the decorative coating on the latter sheet.

In order to assist in this transfer of the decorative coating from the Cellophane sheet to the base sheet, means are preferably provided for loosening the bond between the decorative coating and the Cellophane sheet. A convenient way of doing this is to provide a suitable device 28 for moistening the Cellophane. The application of heat, or the use of solvents, may be employed to effect the loosening, depending upon the character of the sheets and the type of adhesive used. In this process it will be noted that the Cellophane sheet 21 does not comprise a part of the final covering material, but merely operates as a carrier or transfer sheet during the process. The double transfer process just described is important because the final decorative coating has a character different from that of the original pick-off, and enables making a product of the type of Fig. 4 with a smoother surface on layer 17 when such is desirable. This change comes about due to the second pressing operation and the subsequent transfer from one sheet to another.

Figure 8:
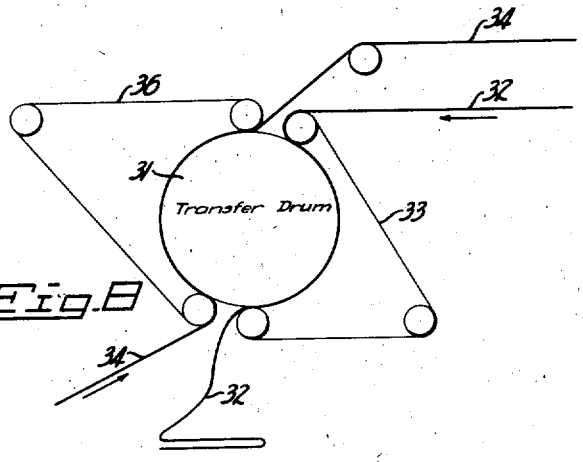
Fig. 8 is also a diagrammatic view, illustrating still another form of process.

A variation of the above process is illustrated diagrammatically in Fig. 8, in which the decorative layer of plastic composition is transferred by a drum 31 instead of by an intermediate sheet. The plastic sheet 32 is shown pressed against the heated drum 31 by a suitable pressure belt 32. After passing between the drum and belt the plastic sheet is peeled from the drum, leaving thereon a thin layer of the plastic composition. After the plastic sheet 32 has been peeled off, a second sheet 34, having greater adhesive properties than the transfer drum is fed into engagement with the coated drum and pressed thereagainst by a second pressure belt 36. As the sheet 34 leaves the transfer drum 31 it carries with it the layer of plastic composition which had been picked off from the parent sheet 32 by the drum. The sheet 34 upon which the decorative coating is finally deposited may be of any suitable material, such as paper, and may be treated, prior to its contact with the drum, with a suitable cementitious material to promote its adhesive properties.

I claim:

1. The steps in the method of making a covering material which comprise placing a preformed sheet against the surface of a body, forming a bond between the sheet and body which exceeds the bonding between the particles of the sheet, and then peeling the sheet from the body so that surface portions comprising an integral part of the sheet are split off and retained on the surface of said body.

2. The steps in the method of making a covering material which comprise placing a preformed plastic sheet against the surface of a body, applying heat and pressure to form a bond between the sheet and body which exceeds the bonding between the particles of the sheet, and then peeling the sheet from the body so that surface portions comprising an integral part of the sheet are split off and retained on the surface of said body.

3. The steps in the method of making a covering material which comprise placing a preformed plastic sheet against the roughened surface of a body, applying heat and pressure to form a bond between the sheet and body which exceeds the bonding between the particles of the sheet, and then peeling the sheet from the body so that surface portions comprising an integral part of the sheet are split off and retained on the surface of said body.

4. The steps in the method of making a covering material which comprise placing a preformed plastic sheet embodying an inlaid design against the surface of a body, applying heat and pressure to form a bond between the sheet and body which exceeds the bonding between the particles of the sheet, and then peeling the sheet from the body so that surface portions comprising an integral part of the sheet are split off and retained on the surface of said body.

5. The steps in the method of making a covering material which comprise placing a preformed sheet against the surface of a body, forming a bond between the sheet and body which exceeds the bonding between the particles of the sheet, then peeling the sheet from the body so that surface portions comprising an integral part of the sheet are split off and retained on the surface of said body, placing another sheet against said body, forming a bond between the latter sheet and said portions of the first sheet which exceeds the bonding between said portions and the body, and then stripping the second mentioned sheet from the body to transfer the portions of the first sheet to said second mentioned sheet.

6. The method of forming a decorative coating on a sheet, which comprises placing a preformed plastic sheet embodying an inlaid design against the sheet to be decorated, forming a bond between the sheets which exceeds that between the particles of the plastic sheet, and then peeling the plastic sheet from the one being decorated so that surface portions of the plastic sheet are split off and retained on the surface of the sheet being decorated to impart thereto a pattern characterizing the design inlaid in the plastic sheet.

7. The steps in the method of making a covering material, which comprise placing a sheet of uncured linoleum against the surface of a body, pressing the linoleum against the body to form a bond therebetween which exceeds the bonding between the particles of linoleum composition, and then peeling the sheet from the body so that a surface film of linoleum is split off and retained as a coating on the surface of the body.

8. The method of forming a decoration on a surface, which comprises applying a pigmented decorative substance to one side of a carrier sheet composed of Cellophane, laminating said one side of the carrier sheet to a surface to be decorated, treating the other side of said carrier sheet with water to weaken the bond between the carrier sheet and decorative substance, and peeling the carrier sheet from said surface to effect a transfer of said substance thereto.

9. The method of forming a decoration on a sheet of paper, which comprises applying a design of a pigmented decorative substance to one side of a carrier sheet composed of Cellophane, laminating said one side of the carrier sheet to a sheet of paper by a pigmented coating of an adhesive substance, wetting the other side of said carrier sheet, and peeling the wet carrier sheet from said paper to effect a transfer of said decorative substance and adhesive substance thereto.

10. The method of forming a decoration on a surface, which comprises applying a decorative substance to one side of a carrier sheet composed of Cellophane, laminating said one side of the carrier sheet to a surface to be decorated, treating the opposite side of said carrier sheet with a fluid which will weaken the bond between the carrier sheet and said decorative substance, and peeling the carrier sheet from said surface to effect a transfer of said decorative substance thereto.

11. The method of forming a decoration on a sheet of paper, which comprises contacting one side of a carrier sheet composed of Cellophane with a surface having disposed thereon a decorative substance in the form of a design, removing said carrier sheet from contact with said surface to effect a transfer of said decorative substance to said carrier sheet, laminating said one side of the carrier sheet and said decorative substance to a fibrous material to be decorated by a pigmented adhesive coating, wetting the other side of said carrier sheet, and peeling the wet carrier sheet from said fibrous material to effect a transfer of said decorative substance and adhesive coating thereto.

12. The method of forming a decorative coating on a sheet, which comprises placing a preformed sheet against the surface of a body, forming a bond between this sheet and body which exceeds the bonding between the particles of the sheet, pulling the sheet from the body so that surface portions comprising an integral part of the sheet are split off and retained on the surface of the body, laminating said body to a surface to be decorated by an adhesive coating, and pulling said body from said surface and said particles to effect a transfer of the latter to said surface.

13. The method of decorating a surface, which comprises producing a laminated structure having a surface to be decorated adhesively secured to a sheet of Cellophane and a design between said sheet of Cellophane and said surface, wetting the outer portion of said Cellophane, and stripping the Cellophane from said surface to leave said adhesive and design on the latter.

14. The method of decorating a fibrous material, which comprises producing a laminated structure having said fibrous material adhesively secured to a sheet of Cellophane and a design between said sheet of Cellophane and said fibrous material, treating the outer portion of said sheet of Cellophane with a fluid which will weaken the bond between the sheet of Cellophane and the fibrous material, and peeling the sheet of Cellophane from the fibrous material.

ABRAHAM BECK MILLER.